United States Patent [19]
Bigham et al.

[11] Patent Number: 5,723,516
[45] Date of Patent: Mar. 3, 1998

[54] INORGANIC PARTICLES COATED WITH ORGANIC POLYMERIC BINDERS COMPOSITE SHEETS INCLUDING SAME AND METHODS OF MAKING SAID COATED PARTICLES

[75] Inventors: W. Stuart Bigham, Woodbury; Dean M. Moren, North St. Paul, both of Minn.

[73] Assignee: Minnesota Mining and Manufacturing Company, St. Paul, Minn.

[21] Appl. No.: 754,469

[22] Filed: Nov. 22, 1996

Related U.S. Application Data

[63] Continuation of Ser. No. 424,594, Apr. 17, 1995, abandoned, which is a continuation of Ser. No. 136,584, Oct. 14, 1993, abandoned.

[51] Int. Cl.[6] ............................. C08J 3/21; C08L 23/02
[52] U.S. Cl. .................... 523/205; 523/202; 523/212; 524/5; 524/176; 524/183; 524/261; 524/265; 524/398; 524/399; 524/442
[58] Field of Search .................... 523/202, 205, 523/212; 524/5, 176, 183, 261, 265, 398, 399, 442

[56] References Cited

U.S. PATENT DOCUMENTS

| | | | |
|---|---|---|---|
| 2,491,487 | 12/1949 | Faulwetter | 524/5 |
| 3,228,907 | 1/1966 | Eash | 524/5 |
| 3,249,464 | 5/1966 | Nelson et al. | 523/212 |
| 3,498,809 | 3/1970 | Anderson et al. | 524/5 |
| 4,080,190 | 3/1978 | Law et al. | 428/447 |
| 4,313,979 | 2/1982 | Frye et al. | 524/266 |
| 4,426,476 | 1/1984 | Chang | 524/288 |
| 4,582,425 | 4/1986 | Rabine et al. | 356/36 |
| 4,999,249 | 3/1991 | Deschler et al. | 428/447 |
| 5,162,390 | 11/1992 | Tilley et al. | 522/64 |
| 5,214,085 | 5/1993 | Patel et al. | 524/493 |
| 5,218,014 | 6/1993 | Matsumoto et al. | 523/212 |
| 5,230,962 | 7/1993 | Stephenson | 524/267 |
| 5,328,683 | 7/1994 | Harashima | 523/212 |
| 5,346,939 | 9/1994 | Moren et al. | 524/176 |
| 5,364,693 | 11/1994 | Moren et al. | 428/290 |

FOREIGN PATENT DOCUMENTS

| | | | |
|---|---|---|---|
| 0314584 | 5/1989 | European Pat. Off. | 523/212 |
| 58-57460 | 10/1981 | Japan | C08L 83/04 |

OTHER PUBLICATIONS

"Rock", *Hackh's Chemical Dictionary*, J. Grant ed., NY, NY, McGraw–Hill Book Co., 1969, p. 585.

Schamberg et al. "Silicone Resin Precursors as Low Molecular Building Blocks of Resins for Varnish Binders," Reprint from *Goldschmidt informs*, No. 63 Function Oligomers, Apr. 1984.

*Primary Examiner*—Andrew E. C. Merriam
*Attorney, Agent, or Firm*—Scott A. Bardell; Harold C. Knecht, III

[57] ABSTRACT

A granular material is presented comprising inorganic particles coated with an organometallic polymeric binder, the organometallic polymeric binder comprising the reaction product of water with at least one component of a binder precursor composition. The binder precursor composition is selected from the group consisting of 1) a first composition comprising an inert organic polymer and a hydrolyzable liquid organometallic solvent; 2) a second composition comprising a water reactive organic polymer dissolved in an inert organic solvent; and 3) a third composition comprising the water reactive organic polymer dissolved in the hydrolyzable liquid organometallic solvent.

20 Claims, No Drawings

INORGANIC PARTICLES COATED WITH ORGANIC POLYMERIC BINDERS COMPOSITE SHEETS INCLUDING SAME AND METHODS OF MAKING SAID COATED PARTICLES

This is a continuation of application Ser. No. 08/424,594 filed Apr. 17, 1995, now abandoned, which is a continuation of application Ser. No. 08/136,584 filed Oct. 4, 1993, now abandoned.

BACKGROUND OF THE INVENTION

1. Brief Description of the Invention

This invention relates to inorganic particulate materials having an organometallic coating. Such particles find use for example as roofing granules.

2. Related Art

Roofing granules have long been used in the asphalt shingle industry to provide the shingle itself with both an aesthetic appeal and protection from degradation by ultraviolet (UV) light. It is this protection against UV degradation which extends the life of the asphalt shingle and consequently the effective life of the roof. For this reason, it is imperative that once the roofing granules are embedded into the asphalt shingle, that they remain adhered thereon.

One factor which affects the extent of adhesion between the roofing granules and the asphalt (or other adhesive) surface is the coating on the granule itself. Historically, this coating is typically a clay:silicate ceramic which has been insolubilized on the rock surface by heating to modestly high temperatures via a kiln furnace. Clay:silicate ceramic coated granules may also contain a variety of inorganic pigments which add color. Coatings produced in this way are often highly porous and can leach out a variety of acidic or basic materials upon contact with moisture. In addition, their surfaces are often highly charged, making the granules less compatible with asphalt than a neutral surface. Weakly acidic species are commonly added following kiln firing to neutralize any surface charge. Such neutralization processes (referred to in the art as "pickling") are expensive and may cause premature corrosion of granule processing equipment.

One solution to this problem is to simply heat the roofing granules to much higher temperatures (e.g. 900° F., 482° C.) to yield a more completely "cured" granule coating. More appealing from an equipment corrosion standpoint, higher temperatures tend to require slower production rates as well as increased energy consumption.

Silicones are also usually added to roofing granules after kiln-firing as a post-treatment step both to increase the wettability of the granule to asphalt and provide water repellency. Roofing granules which are highly alkaline or lack water repellency may adhere to the asphalt more poorly. Water is able to infiltrate the granule-asphalt interface and cause separation of the granule from the asphalt. This solution has thus proved to be effective on a short term basis due to silicone degradation with time. In addition, acidic pickling may interfere with the cure of the silicone, rendering it ineffective.

Current methods of manufacturing roofing granules, outlined above, suffer from several other disadvantages. First, because of the elevated temperatures used in the kiln, normally required to "cure" the ceramic coating, the use of heat sensitive organic pigments to impart color on roofing granules is largely impossible. Although lower temperature kiln processes have been developed to accommodate this limitation, excessive amounts of acidic pickle solution are required at the end of the process to accomplish this objective. In some cases, premature fading of the pigment is also noted.

SUMMARY OF THE INVENTION

The present invention allows for the use of heat sensitive organic pigments because of low temperature processing involved (preferably room temperature, about 25° C.). An additional advantage of low temperature processing is the reduction in energy expenditures per ton of granules produced without seriously affecting the rate of production. Low temperature processing tends to render usable rock which is otherwise unusable because of its tendency to fracture at elevated temperatures. Finally, granules produced according to this invention have been shown to exhibit better adhesion to asphalt and other adhesive substrates than ceramic-coated granules. Better adhesion of the granule to the asphalt surface decreases the probability of granule loss and subsequent premature degradation of the shingle due to UV light.

The binders of the inventive coated granules are generally crosslinked, and therefore are resistant to organic solvents, and are more abrasion resistant than other organic coatings. Further, the organometallic binders are amenable to further functionalization.

The coated granules of the present invention comprise inorganic particles, which may be porous or substantially devoid of void space, coated with organometallic polymeric binders and, preferably, an organic pigment. As used herein the term "organometallic polymeric binder" is a binder which comprises the reaction product of water with at least one component of a binder precursor composition, the binder precursor composition selected from the group consisting of:

1) a first composition comprising an inert organic polymer and a hydrolyzable liquid organometallic solvent;

2) a second composition comprising a water reactive organic polymer dissolved in an inert organic solvent; and 3) a third composition comprising a water reactive organic polymer dissolved in a hydrolyzable liquid organometallic compound.

Methods of making the inventive coated granules are another aspect of the invention. One preferred method comprises the steps of:

(a) forming a binder precursor composition as previously described;

(b) exposing a plurality of inorganic granules to moisture thereby yielding moisturized inorganic granules;

(c) preferably combining an organic pigment with the moisturized inorganic granules to form pigmented moisturized inorganic granules;

(d) combining the moisturized inorganic granules with the binder precursor composition to yield binder precursor composition-coated granules; and (e) exposing the binder precursor composition-coated granules to conditions sufficient to polymerize the binder precursor composition.

It will be recognized by those skilled in the art that various steps may be combined or performed in a different manner: for example, step (a) may include the organic pigment rather than step (c); steps (a) and (b) may be reversed or carried out simultaneously; and steps (a)–(d) may be combined. All of these method embodiments are considered within the invention. The "exposing" step (e) preferably comprises heating the binder precursor coated granules to moderate temperatures for a time sufficient to cure the binder precursor composition, for example temperatures ranging from about 100° C. to about 150° C. and times preferably ranging from about 10 to about 60 minutes.

As used herein the term "inert" means a substance which is non-reactive with water. "Binder" means a cured binder, whereas "binder precursor composition" means an uncured mixture.

More specifically, binder precursor compositions useful in the invention preferably comprise:

1) a solvent selected from the group consisting of
  a) an inert organic liquid devoid of organometallic compounds; and
  b) a liquid organometallic compound having the general formula:

$(R^1O)_xMR^2_{(y-x)}$ wherein
$R^1$ is selected from the group consisting of alkyl, cycloalkyl, aryl, or acyl;
$R^2$ is selected from the group consisting of hydrogen, alkyl, cycloalkyl, or aryl;
x is an integer ranging from 1 to y, inclusive;
y is an integer equalling the valence of M;
M is selected from the group consisting of B, Al, Si, and Ti; and 2) an organic polymeric material selected from the group consisting of addition polymers devoid of water reactive groups, silane-functional addition polymers, condensation polymers devoid of water reactive groups, silane-functional condensation polymers, and combinations thereof, the polymeric material having a weight average molecular weight of at least about 1000 wherein at least two in any sequence of three consecutive polymeric backbone atoms is carbon, with the proviso that either the solvent or the polymer or both are water reactive.

Preferred water reactive organic polymers are those derived from the reaction of an alkyl methacrylate and an alkoxysilylalkylmethacrylate, the alkoxysilylalkylmethacrylate being selected from the group consisting of compounds within the general formula

$$(R^3O)_nR^4_{3-n}Si(CH_2)_zOC-C=CH_2$$
with O double bonded to C and CH₃ on the middle C wherein:
n=an integer ranging from 1 to 3 inclusive;
z=an integer ranging from 1 to 10 inclusive;
$R^3$ is selected from the group consisting of alkyl, cycloalkyl, aryl, or acyl; and
$R^4$ is selected from the group consisting of hydrogen, alkyl, cycloalkyl, or aryl.

Binders derived from the reaction of an alkyl methacrylate and an alkoxysilylalkylmethacrylate, while in the presence of a ultraviolet light stabilizer, are particularly preferred.

As used herein the terms "addition polymer" and "condensation polymer" are those well known in the chemical arts. Addition polymers are those polymers generally prepared by joining vinyl-type monomers by free radical or ionic mechanisms. Condensation polymers are those polymers typically prepared by stepwise coupling of monomers with the expulsion of small molecules.

Compositions useful in the methods of the present invention may be prepared by any one of a variety of methods, including the following methods:

a) dissolving or dispersing a preformed polymer in a first solvent;

b) combining a first solvent with a solution comprising a polymer in a second solvent and subsequently removing the second solvent; and c) synthesizing a polymer in the presence of a first solvent.

Another aspect of the invention is a composite sheet suitable for use in building material, the composite sheet comprising a backing, the backing at least partially coated with an adhesive (preferably asphalt), the adhesive in turn at least partially coated with the inventive coated granules.

Other aspects and advantages of the invention will become apparent from the description of preferred embodiments which follows.

DESCRIPTION OF PREFERRED EMBODIMENTS

I. Formation of Binder Precursor Compositions

All binder precursor compositions useful in the invention comprise an organic polymer and a first organic solvent, wherein the mixture comprises from about 10 to about 90% by weight of first organic solvent and from about 10 to about 90% by weight of a polymer, preferably from about 40 to about 80% first organic solvent and from about 20 to about 60% polymer. The mixture may be optionally agitated and/or warmed to facilitate solution formation. Mechanical stirring of the mixture is preferred and heating of the mixture at temperatures up to and including the boiling point of the first organic solvent is preferred. Formation at temperatures above the boiling point of the liquid mixture, attainable for example in a sealed reactor, may also be useful.

Binder precursor compositions useful in the invention may be formed by way of solvent exchange, this method being preferred when working with polymers having limited solubility in the first organic liquid, such as when the binder precursor composition comprises tetraethoxysilane as the first organic solvent, 2-butanone as the second organic solvent, and polystyrene as the polymer. This method comprises the steps of a) synthesizing an organic polymer or dissolving a preformed organic polymer in a second organic solvent to form a polymer solution, preferably using a second organic solvent possessing a boiling point lower than that of the above-mentioned first organic solvent; b) diluting the polymer solution with a first organic liquid selected from those above-mentioned preferred first organic liquids; and c) removing the second organic solvent, preferably by temporarily warming the polymer solution and allowing the second organic solvent to distill, and more preferably by conducting the distillation at a reduced pressure.

Direct synthesis of an organic polymer in the first organic solvent is useful and may be preferred, for example, when the required polymer is not commercially available or when the preformed polymer has limited solubility in the first organic solvent. This method is particularly attractive when conducting addition polymerizations. The addition polymerization may be conducted using standard free radical, cationic, anionic, or group transfer polymerization techniques. Monomers useful in the invention include acrylates, methacrylates, acrylamides, vinyl esters, vinyl aromatics, vinyl ethers, vinyl heterocycles, and the like. Specific examples of useful monomers include ethyl acrylate, isobutyl methacrylate, dimethylacrylamide, vinyl acetate, styrene, isobutyl vinyl ether, and vinyl carbazole. The polymerization may be initiated thermally, photochemically or by other means known in the art. Useful polymerization initiators include but are not limited to azo and peroxide functional compounds, substituted acetophenones and benzophenones, and iodonium salts. Specific examples of useful initiators include azobis(isobutyronitrile), tert-butyl peroxybenzoate, benzoin ethyl ether, 2,2-dimethoxy-2-phenylacetophenone, and 4,4'-bis(dimethylamino)benzophenone and diphenyliodonium chloride, and the like. The monomers and initiators in this preferred method are preferably added independently, either continuously or in a batchwise mode, to the first organic solvent.

Non-reactive substituents which may be affixed to the organic polymer backbone include hydrogen, fluorine, and chlorine atoms, alkyl, alkenyl, aryl, carboalkoxy, carbamides, alkoxy, carboxyl, nitrile, pyrrolidinone, carboxylic acid groups and the like. Additionally, pendant hydrolyzable siloxane functionalities may be present. The term "organic polymer" is meant to include copolymers, that is, polymers derived from several different monomers, for example, poly(styrene-co-butadiene), poly(acrylonitrile-co-butadiene-co-styrene), poly(octadecyl vinyl ether-co-maleic anhydride), and the like. The term "organic polymer" is further meant to include polymer blends former from the combination of two or more dissimilar polymers, for example, an intimate mixture of poly(styrene) and poly (styrene-co-butadiene). While the presence of other highly reactive substituents such as acrylate, aziridine, isocyanate, and epoxide groups may be acceptable from a performance standpoint, they may introduce health concerns and therefore are preferably absent.

Addition polymerizable monomers useful in the present invention may be derived from alkene functional monomers, which are void of additional reactive substituents as defined previously. Useful monomers include but are not limited to ethylene, isobutylene, 1-hexene, chlorotrifluoroethylene, vinylidene chloride, butadiene, isoprene, styrene, vinyl naphthalene, ethyl acrylate, 2-ethylhexyl acrylate, tetrahydrofurfuryl acrylate, benzyl acrylate, poly(ethylene oxide) monoacrylate, heptafluorobutyl acrylate, acrylic acid, methyl methacrylate, 2-dimethylaminoethyl methacrylate, 3-(methacryloxypropyltris(trimethylsiloxy))silane, isobutyl methacrylate, itaconic acid, vinyl acetate, vinyl stearate, dimethylacrylamide, tert-butyl acrylamide, acrylonitrile, isobutyl vinyl ether,vinyl pyrrolidinone, and the like.

Other polymers useful in the present invention include those bearing hydrolyzable siloxane functional groups and may be prepared from hydrolyzable siloxane functional monomers, initiators, and/or chain transfer agents such as: vinyltriethoxysilane,
vinyltris(2-methoxyethoxy)silane,
3-methacryloxypropyltrimethoxysilane,
4,4'-azobis(4-cyano-N-(1-(3-triethoxysilylpropyl)) pentanamide),
3-mercaptopropyltrimethoxysilane, and the like.
Polymers bearing hydrolyzable siloxane functionality are preferred in that the pendant siloxane moiety may provide a covalent coupling of the organic and inorganic phases.

Condensation polymers useful in the present invention are those possessing, for example, backbone ester, ether, and sulfone linkages. Condensation polymers possessing more than one functional group, for example poly(ester-amide)s, may also be useful. Polyesters, for example poly(neopentyl glycol sebacate) and poly(caprolactone), and polyethers, for example poly(ethylene oxide-co-propylene oxide), are preferred condensation polymers. Condensation polymers of the present invention may also include those bearing hydrolyzable siloxane functionalities. Condensation polymers bearing hydrolyzable siloxane functionalities may be prepared by the reaction of:

i) a condensation polymer having at least one reactive functionality selected from the group consisting of —OH, —SH, —NHR and —NH$_2$, wherein R is an organic radical having from 1 to 10 carbon atoms; and ii) an isocyanato alkyl-alkoxy silane. Example of these include the reaction of an alcohol-, mercaptan-, or amine-functional condensation polymer with 3-isocyanatopropyltriethoxysilane. Examples of inert liquid organic solvents useful as first and second organic solvents include methyl ethyl ketone, toluene, xylene, 1,2-dichloroethane, tetrahydrofuran, dimethylformamide ethylacetate, and the like. It will be understood by those skilled in the art that the first and second organic solvents are chosen with sufficiently different boiling points to avoid difficulty of separation by distillation. Preferably, the boiling points should differ by 40° C. or more.

Hydrolyzable liquid organometallic compounds useful in the present invention include trimethyl borate, triethyl borate, triisopropyl borate, tri-n-butyl borate, aluminum tri-sec-butoxide, diethylaluminum ethoxide, tetramethoxysilane, tetraethoxysilane, tetraphenoxysilane, tetra(2-(2-methoxyethoxy)ethoxy)silane, tetraacetoxysilane, triethoxysilane, ethyl triethoxysilane, dimethyldiethoxysilane, trimethylsilylphenoxide, diphenyldimethoxysilane, titanium (IV) isopropoxide, titanium (IV) propoxide, and titanium (IV) 2-ethylhexoxide. The liquid products of partial hydrolysis of organometallic compounds, for example polydiethoxysilane, may be utilized as well. A preferred organometallic liquid is tetraethoxysilane (TEOS) because of its low toxicity (oral-rat LD50:6270 mg/kg), its high boiling point (169° C.) and high flash point (46° C.), its innocuous hydrolysis product (ethanol), its availability and low cost, as well as its high yet controllable rate of hydrolysis. Embodiments wherein the organometallic solvent is comprised of a single organometallic liquid and those embodiments wherein a combination of several different organometallic liquids are employed are considered within the scope of the invention.

The binder compositions of the present invention may contain effective amounts of additives such as surfactants, catalysts, and ultraviolet and oxidation stabilizers. Ultraviolet light absorbers, light stabilizers, and antioxidants may be necessary to provide acceptable product lives by improving the stability of the binder. Compounds useful for these purposes in the invention include, for example, substituted benzophenones, benztriazoles, phenols, sebacates, and the like. Preferred light stabilizers are sebacates, especially hindered amine sebacates such as the light stabilizer presently known under the trade designation TINUVIN 123, which has the generic chemical formula bis-(1-octyloxy-2, 2,6,6-tetramethyl-4-piperidinyl) sebacate. Preferred ultraviolet light absorbers are substituted benzotriazoles such as that presently known under the trade designation TINUVIN 384, which is 3-(2H-benzotriazol-2-yl)-5-(1,1-dimethylethyl)-4-hydroxy-benzenepropanoic acid. Both compounds are available from Ciba-Geigy Corp., Ardsley, NY. The stabilizers, if used, generally and preferably are present at a weight percentage ranging from about 1 to about %5, based on weight of binder precursors.

The incorporation of a surfactant in the binder precursor composition may be desirable because its presence may allow water to be mixed more uniformly throughout the binder precursor mixture and it may allow for more complete coverage of the inorganic particles. Surfactants useful in the practice of the present invention include anionic, cationic, and nonionic surfactants. Preferred are commercially available non-ionic surfactants including but are not limited to polyethylene oxide, polyethylene oxide nonylphenyl monoether, and propylene oxide—ethylene oxide block copolymers.

Incorporation of a catalyst in the binder precursor mixture will often increase the rate of hydrolysis and the subsequent condensation reaction of both the hydrolyzable organometallic solvent and polymer bound silane. Both acidic and basic catalysts may be useful, as well as organometallic cataylsts such as dibutyltin dilaurate. Acid catalysts include but are not limited to ethanesulfonic acid, benzenesulfonic acid, trifluoromethanesulfonic acid, trifluoroacetic acid, acetic acid, hydrochloric acid, sulfuric acid, and nitric acid. Compounds which generate acids on contact with water may also be useful catalysts and include but are not limited to boron trifluoride etherate, acetyl chloride, p-toluenesulfonyl chloride, trifluoroacetic anhydride, thionyl chloride, and tetrachlorosilane. Base catalysts useful in the practice of the present invention include but are not limited to
1,1,3,3-tetramethylguanidine,
1,8-diazabicyclo(5.4.0)undec-7-ene,
1,4-diazabicyclo(2.2.2)octane,
4-dimethylaminopyridine, triethylamine, tributyltin oxide, calcium hydroxide, and ammonium carbonate. The strong acid and strong base catalysts are preferred when a fast cure is desired and the weaker acids and bases are preferred to promote slow cures.

Objects and advantages of this invention are further illustrated by the following test methods and examples, but the particular materials and amounts thereof recited in these examples, as well as other conditions and details, should not be construed to unduly limit the invention.

Test Methods

Water Repellency and IPA Modified Water Repellency Tests

The hydrophobicity of the inventive granules was determined in accordance with the following two tests. Approximately 5 grams of finished granules to be tested were placed in a test tube. While covering the mouth of the test tube with a finger, the tube was inverted and the granules were allowed to slowly escape so as to form a small pile. The top of the pile was then indented with the base of the test tube so as to form a concave surface which was used to receive 3 drops of water (or water:isopropyl alcohol (IPA) mixture, depending on the test liquid used) The time required for penetration of the water into the granules was recorded.

The IPA-modified water repellency of treated samples measured using this test was expressed in terms of the "WATER:IPA" rating of the treated granules. Treated granules which were penetrated by or only slightly resistant to a 100% water/0% IPA mixture, the least penetrating of the test mixtures, were given a rating of 100:0, whereas treated granules resistant to a 0% water:100% isopropyl alcohol mixture, the most penetrating of the test mixtures, would be given a rating of 0:100. Other intermediate values were determined by the use of other water:isopropyl alcohol mixtures, in which the percentage amounts of water and isopropyl alcohol were varied with respect to one another. The Water:IPA rating corresponds to the most penetrating mixture which does not penetrate or wet the granules after 10 seconds contact. For the purposes of this invention, ratios of water:IPA ranged from 100:0 to 70:30 in increments of 5. This test was fashioned after the water repellency test described in U.S. Pat. No. 4,426,476, which is incorporated herein for the purposes of this test. In general, the water repellency test was run for 60 minutes. Any granules which held out 3 drops of water or IPA:water for the entire period of time were considered to have reached the best level attainable for this test.

Asphalt Wettability Test (Reverse Wettability)

This test was used to determine the completeness of distribution of the adhesion treatment on roofing granules. An asphalt soft enough to pour readily at 15.5° C. is used. The asphalt was made by adding 13 parts of a Mid-Continent 130° F. (54.4° C.) melt point saturant to 10 parts by weight of oil having a Saybolt viscosity of 635. The mixture was heated with stirring at a temperature not higher than 250° F. (121° C.) until the asphalt was thoroughly dissolved in the oil. The mixture was allowed to cool to room temperature (about 20° C.) before using in the test.

To an estimated quantity of 10 grams of granules in a 100 ml beaker were added about 50 ml of water. With a suitable spatula about 2 grams of the asphalt was placed into the granule-water mixture and stirred for 1 minute, constantly attempting to coat the granules with asphalt. While the whole mass of granules and asphalt was under water and after cessation of stirring, the percentage of total granule surface coated by the asphalt was estimated. After 5 minutes, the mass of granules was observed again. The lower of the two estimates was reported.

In terms of % wettability, a rating of "100" is always the target since that indicates that the entire exposed surface of each granule has been wet out by the asphalt.

L*a*b* Scan Color Matching Test

Since color is the first stimulus that the consumer perceives, resulting in an immediate evaluation of roofing granule quality, color consistency is one of the principal quality attributes of roofing granules. To determine the color of roofing granules, a machine known under the trade designation "HunterLab LabScan Spectrocolorimeter" model 6000 was used. A sample preparation device, which is described in U.S. Pat. No. 4,582,425, was used to prepare the samples.

The spectrocolorimeter is designed to measure the reflectance color of objects. The spectrocolorimeter measuring geometry used was 0°/45°. This geometry provided for viewing the samples similar to normal visual evaluation, with 0° illumination, or perpendicular illumination of the sample, in 45° viewing of the sample. 45° circumferential viewing effectively excludes the specular (glossy) reflectance. This geometry essentially eliminated the effect of the sample directionality or granule texture.

As explained in the HunterLab LabScan Spectrocolorimeter brochure, light from a halogen lamp passes through a series of filters and lenses to simulate D65 daylight and eliminate heat, and is focused on the sample in a circular pattern. (Roofing granular color was read in "Illuminant D65", which represents daylight with a correlated color temperature of approximately 6500° Kelvin.) Light diffusely reflected from the sample is collected by sixteen fiber optic bundles staged circumferentially at 45° to the sample. The light input from all stations was averaged to eliminate errors caused by sample texture and directionality, and was then directed onto the circular variable filter which was spun continuously, separating the light into its component wavelengths. The separated light was picked up by a single photo detector, and then fed to a personal computer via an analog-to-digital converter. The computer processes measurement data at 10 nanometer intervals across the visual spectrum, from 400 to 700 nanometers.

For the color determination tests, the 10° CIE Standard Observer (CIE stands for the Commission International de l'Eclairage, an international commission on illumination).

The "Standard Observer" is the spectral response characteristic of the average observer defined by the CIE. Two such sets of data are defined, the 1931 data for the 2° visual field (distance viewing) and the 1964 data for the annular 10° visual field (approximately arms length viewing). A much better agreement with the average visual assessment can be obtained by making use of the 10° standard observer, and thus this was the observer used in these tests.

For each color granule tested, a sample was scanned by the spectrocolorimeter. This scan produced a numerical description of the colored sample, a fingerprint, which never changes. However, since it does not consider the lighting condition and the observer, the CIE L*a*b* does not completely describe the visual appearance of the color. A mathematical means of translating fingerprints into a set of three numbers (XYZ), tristimulus values, was developed. The tristimulus values describe color as a normal observer sees it under a specific lighting condition.

Because the tristimulus values (XYZ) do not provide either uniform or logical estimates of perceived color intervals or color relationships, scales based on the CIE standard observer were transformed into the "opponent-colors" theory of color vision. The 1976 CIE L*a*b* is one such transformation. The opponent-colors theory maintains that the interaction between the eye and the brain decodes the experience of a color into three specific signals. One of these signals is lightness-darkness (L*), one is red-green (a*) and one is yellow-blue (b*). This color system was chosen for use in these tests because it is believed to be understandable by both the color scientist and the novice. Thus all instrument color readings were taken on a HunterLab LabScan Spectrocolorimeter, in Illuminant D65, with 10° observer, in 1976 CIE L*a*b* color space. All Comparative Example granules in the Examples which follow were read after an oil had been removed from the granules. The oil removal procedure is described in the following test procedure.

After the granules were deoiled, the granule preparation procedure of U.S. Pat. No. 4,582,425 was used. Briefly, this procedure consisted of loading a layout sample dish by slightly overfilling the dish with granules, compressing the granules into the dish with the flat surface of a layout tray, using only vertical pressure and no circular action. The loaded sample dish in each test was positioned on the layout device, matching the configuration, so that the sample dishes were in the locked position. A roll carriage was then gently lowered onto the sample dish, after which the roller is pulled back and forth across the surface on the face of the granules. It was found that twice across the surface produced the desired smooth, even, flat, and undented surface necessary for precise color readings. Excess granules fall over the sample dish edge.

The prepared granule sample dish was then placed into the instrument sample port. The sample surface was first examined to insure that the sample has not "popped" and lost its smooth level surface.

Two complete spectrocolorimeter readings (scans) were taken, completely emptying and repeating the layout procedure each time. The procedure was repeated until two readings consistent with each other to within less than 0.3 unit range were obtained. If not, the procedures were repeated with more attention to detail. All samples presented to the spectrocolorimeter for color difference determination were at ambient temperature (hot granules give inaccurate color readings, as well as wet granules). After deoiling the granules in accordance with the procedure explained below, the granules were in all cases read within four hours of deoiling. (Samples left in an uncontrolled condition may exhibit unwanted changes, and samples that have been deoiled and then left standing for a long period of time are not acceptable for spectrocolorimeter readings.)

In interpreting the results from the spectrocolorimeter, the opponent-color scales give measurements of color in units of approximate visual uniformity throughout the color solid. L* measures lightness and varies from 100 for perfect white, to zero for black, approximately as the eye would evaluate it. a* and b*, the chromaticity dimensions, give understandable designations of color as follows: a* measures redness when plus, grey when zero, and greenest when minus; and b* measures yellowness when plus, grey when zero, and blueness when minus. Acceptable opponent color scales for the granules of the present invention are when all three of L*, a* and b* are within +/−1.0 of the standard black roofing granules, more preferably within +/−0.5 of the L*, a* and b* measures of the standard roofing granules.

Target values for black granules of the invention are L*=21.4, a*=−0.01, and b*=0.68, while target values for brown granules of the invention are L*=38.9, a*=12.4, and b*=16.7.

Deoiling Procedure for Comparative Examples

As explained previously, oil is frequently added to roofing granules as an adhesion medium between the asphalt and granule as well as for reducing dust generation during processing of the granules. For quality control, exposed color is the most critical feature; therefore, the exposed color must be assimilated through the deoiling process. The deoiling procedure uses the following equipment:

deoiling funnel,
1,1,1-trichloroethane,
100 milliliter beakers,
distilled water,
vent hood,
vented oven,
screens (Tyler 14 and 20),
timer,
screen brush,
one gallon can,
stirring rod, and
white paper towels.

A sample of oiled granules was first screened to mesh size −14/+20. The screened sample was then placed in a 100 milliliter beaker, the granules filling up to 50 milliliters of a beaker. The beaker was then filled to the rim with 1,1,1-trichloroethane. The granules and trichloroethane were then allowed to sit undisturbed for about five minutes. The granules and trichloroethane were then poured into a deoiling funnel and the solvent drained without stirring into a one gallon can. Next, the funnel was filled with distilled water to the rim and stirred while draining, being sure to collect all solvent and water for proper disposal. The remaining granule samples in the funnel were placed on a white paper towel and dried in a vented oven. The temperature of the oven depended on how long the result can be waited for. At temperatures ranging from about 80° C. to about 110° C., the samples merely needed to be taken out when dry. (At temperatures above 110° C., the samples must be closely watched and removed as soon as possible when dry or the color can be affected. Too long a drying time at a temperature below about 80° C. can result in some "blooming" which will also affect spectrocolorimeter results.) The temperature of the drying oven used for these examples was 150° C. Finally, the dried granules were cooled on paper towels to room temperature on a table top prior to making any color determinations.

Rub Tests (Granule Adhesion to Shingles)

This test was performed to determine the degree of adhesion of coated granules of the invention to asphalt shingles. Five strips were cut from an asphalt shingle which was coated with granules of the invention, each strip being approximately 5.1 cm×22.9 cm (2 inch×9 inch). The long side of the strip was parallel to the direction of the coating machine used to coat the granules onto the shingle. Each strip to be tested was weighed to the nearest 0.05 gram and then clamped into the tray of a test machine known under the trade designation "3M Embedding Test Machine", available from 3M Company, ST. Paul, MN, making certain there were no loose granules under the strip. The machine was fitted with a brush having bristles which passed in contact with and over the granules. The machine was activated so that the test strip was abraded 50 complete cycles (50 forward and 50 back strokes). The test strip was then removed from the machine and gently tapped to remove loose granules. The test strip was then reweighed. The granule adhesion lost was then calculated as A—B, where A was the weight of the test strip before abrasion, and B the weight after abrasion. A loss of weight for the test strip of more than 0.2 gram or less tends to indicate that the granules were overembedded, while test result of more than 1.0 grams probably indicates underembedded granules, which may lead to loss of granules on roofs.

The goal of the alkalinity and rub loss tests was to achieve the smallest number possible. For alkalinity, this simply means that one strives to minimize the amount of titratables leached from the coating during boiling. In the case where very little titratable material was leached out of the granule coating, the "cure" of this material was said to be satisfactory. For rub losses a very low number indicates superior adhesion of the granule to the asphalt.

The materials used in the following synthesis examples were obtained from Aldrich Chemical Co., Milwaukee, WI, unless otherwise specified. All parts and percentages are by weight unless otherwise specified.

EXAMPLES

Binder Precursor Synthesis Examples

Synthesis Example 1

A 90:10 wt:wt copolymer of n-butyl methacrylate (nBMA) and 3-methacryloyloxypropyltrimethoxysilane (available from Union Carbide under the trade designation A174) was prepared at 40% solids in tetraethoxysilane (TEOS). A nitrogen purged solution containing nBMA (108.0 parts), A174 (12.0 parts, Union Carbide, Danbury, CT), and t-butyl peroxybenzoate (3.6 parts) was added dropwise over a one hour period to TEOS (180.0 parts) at 140° C. under a nitrogen blanket. The solution was held at 140° C. for one additional hour. A second portion of t-butyl peroxybenzoate (0.6 parts) was added and the solution was held at 140° C. for two hours. The resulting clear, colorless solution was allowed to cool to room temperature. The solution viscosity at room temperature as measured on a Brookfield viscometer (spindle #2 at 100 rpm) was about 50 centipoise.

Synthesis Examples 2–22

The binder precursors compositions of Examples 2–22 (see Table 1) were all prepared following the general procedure of Synthesis Example 1, except for example 10. The binder precursor of Example 10 was prepared by combining 1800 parts of polypropylene glycol having molecular weight 4000 (available from ARCO Chemical Co. under the trade designation 4025), 222.3 parts 3-isocyanatopropyltriethoxysilane (known under the trade designation A1310 from Union Carbide, Danbury, CT), and 3.6 parts dibutyltin dilaurate, and the combination held at 50° C. for 18 hours to form an adduct, then allowed to cool. 22 parts of TEOS and 125 parts of the adduct were then combined. The binder precursors of Examples 1–22 demonstrated that a variety of polymers and solvents are useful in practice of the invention.

TABLE 1

| Synthesis Example | Polymer Composition[1] (wt. ratio) | Solvent | % Solids | Brookfield viscosity (cps) | GPC MW[2] |
|---|---|---|---|---|---|
| 2 | 95:5 iBMA:A174 | TEOS | 40 | 120 | 12,900 |
| 3 | 90:10 tBMA:A174 | TEOS | 40 | 90 | 8500 |
| 4 | 70:30 CyMA:A174 | TEOS | 40 | 120 | 15,900 |
| 5 | 90:10 EHMA:A174 | TEOS | 40 | 240 | 8000 |
| 6 | 70:30 EHMA:A174 | TEOS | 40 | 280 | 8000 |
| 7 | 70:30 EHMA:A174 | TEOS | 60 | 320 | — |
| 8 | 84:16 iBMA:A171 | TEOS | 45 | 100 | 10,300 |
| 9 | 80:20 nBMA:(Mal.Anh + A1100) | TEOS | 40 | 160 | — |
| 10 | PPG 4025/A1310 adduct | TEOS | 85 | 430 | 4500[3] |
| 11 | 90:10 EHMA:A174 | VP1316 | 40 | 370 | 10,000 |
| 12 | 80:20 EHMA:A174 | VP1316 | 40 | 410 | 12,000 |
| 13 | 70:30 EHMA:A174 | VP1316 | 40 | 380 | 14,000 |
| 14 | 70:30 EHMA:A171 | VP1316 | 40 | 170 | 4000 |
| 15 | 28:9:28:35 EHMA:MPEGMA:FX14:A174 | VP1316 | 45 | — | 10,100 |
| 16 | 20:50:30 MPEGMA:FX14:A174 | VP1316 | 40 | — | 7200 |
| 17 | 52:18:30 EHMA:MPEGMA A174 | VP1316 | 40 | — | 6000 |
| 18 | 70 30 iBMA:A174 | (iPrO)$_4$Ti | 70 | 50 | — |
| 19 | 70.30 iBMA:A174 | pDEOS | 30 | 400 | — |
| 20 | 70:30 iBMA:A174 | (iPrO)$_3$B | 40 | 200 | — |
| 21 | Poly-iBMA | TEOS | 40 | 150 | — |
| 22 | 90:10 nBMA:A174 | PM acetate | 40 | 65 | — |

[1]The following materials were used in Examples 2–22, wherein trade designations are in quotes.
nBMA = n-butyl methacrylate
iBMA = isobutyl methacrylate
tBMA = tert-butyl methacrylate
CyMA = cyclohexyl methacrylate
EHMA = 2-ethylhexyl methacrylate
Mal.Anh. = maleic anhydride
"A171" = vinyltrimethoxysilane (Union Carbide)
"A1100" = 3-aminopropyltriethoxysilane (Union Carbide)
"A1310" = 3-isocyanatopropyltriethoxysilane (Union Carbide)
"PPG4025" = 4000 MW polypropylene glycol (ARCO Chem., Newton Square, PA)
MPEGMA = 350 MW polyethylene glycol monomethacrylate monomethyl ether (International Spec. Chem., Hackettstown, NJ)
"FX-14" = N-(2-methacryloyloxyethyl)-N-ethylperfluorooctylsulfonamide (Minnesota Mining and Manufacturing Co., St. Paul, MN)
"VP1316" = isooctyltrimethoxysilane (Wacker Silicones Corp., Adrian, MI)
pDEOS = poly(diethoxysilane) (Huls, Piscataway, NJ)
PM acetate = 1-methoxy-2-propylacetate
[2]GPC = gel permeation chromatography
[3]calculated molecular weight Synthesis of Roofing Granules Using Organic Binders Example 23

This Example demonstrated one preferred inventive method of making a coated granule having an organic, heat sensitive pigment therein. The raw materials are described in Table 2.

TABLE 2

| Raw Material | g/kg of Raw Rock |
| --- | --- |
| chrome oxide | 4.0 |
| phthalocyanin green pigment | .80 |
| dispersed carbon black | .08 |
| water | 10 |
| polymer solution* | 4.5 |
| dibutyltin dilaurate | .12 |

*Polymer solution is that reported in Synthesis Example 1.

Procedure for Example 23

A 1 kilogram sample of raw rock having a particle size which is 98% +35 mesh Tyler (425 micrometers) was placed in a mechanical stirring pot along with the chrome oxide and dispersed carbon black pigments and the entire mixture was allowed to stir until the pigments had become well dispersed. The water was then added to the pigmented raw rock and the granules were blended until all surfaces had been wetted. Next, a portion of the polymer solution from Example 1, dibutyltin dilaurate, and the phthalocyanin green pigment were added to the wetted rock and were dispersed by stirring. The colored mineral was then transferred to a shallow aluminum pan and placed in a 250° F. (120° C.) oven for 15–30 minutes to set the coating. The binder precursor was assumed to be cured when the coating proved to be insoluble in methylene chloride or 1,1,1-trichloroethane.

Examples 24–44 and Comparative Examples A–C

Table 3 indicates results obtained for inventive granule Examples 24–44 made following the procedure in Example 23.

Table 4 outlines certain quality results for Comparative Examples A–C (raw rock, and white and green ceramic coated raw rock treated with oil and silicone (standard product), respectively). This data was included so that a comparison could be drawn between current production material and the organic polymeric binder-coated granules of this invention.

TABLE 3

Quality test results for white roofing granules using acrylic binders.

| Example | Polymer Solution | g Polymer solution/kg Raw Rock | Color L*a*b | H₂O Repellency (min) | Asphalt Wettability (% surface covered) | Dry Rub Loss (g) | Wet Rub Loss (g) |
| --- | --- | --- | --- | --- | --- | --- | --- |
| 24 | Example 13 | 31.5 | 59.66 -0.72 -1.30 | >60 | 100 | 0.87 | 1.13 |
| 25 | Example 17 | 31.5 | 62.03 -0.49 1.36 | 30 | 100 | 0.51 | 1.47 |
| 26 | Example 17 | 16 | 62.11 -0.58 0.43 | >60 | 100 | 0.14 | 0.39 |
| 27 | Example 15 | 12 | 68.36 -1.13 -0.94 | >60 | 100 | — | — |
| 28 | Example 16 | 12 | 69.99 -1.09 -0.72 | >60 | 80 to 85 | — | — |
| 29 | Example 16 | 15 | 70.28 | >60 | 70 | — | — |
| 30 | Example 13 | 16 | — | — | — | 0.10 | 0.29 |
| 31 | Example 13 | 16 | 31.23 -13.83 11.33 | >60 | 100 | — | — |
| 32 | Example 17 | 16 | 31.96 -13.41 11.39 | 55–60 | 90 | — | — |
| 33 | Example 13 | 6 | 36.03 -15.39 11.45 | >60 | 90 | 0.22 | 0.54 |
| 35 | Example 13 | 3.5 | 37.43 -14.95 11.30 | >60 | 90 to 95 | 0.45 | 0.62 |
| 36 | Example 12 | 4.5 | 37.66 -15.38 11.13 | >60 | 95 | 0.45 | 0.62 |
| 37 | Example 11 | 4.5 | 36.32 -14.81 10.28 | >60 | 100 | 0.34 | 0.58 |
| 38 | Example 6 | 4.5 | — | >60 | 100 | 0.20 | 0.54 |
| 39 | Example 7 | 4.5 | 38.93 -12.73 10.03 | >60 | 80 to 85 | — | — |
| 40 | Example 21 | 4.5 | — | >60 | 80 to 85 | — | — |

| Example | Polymer solution | g Polymer solution/kg Raw Rock | H₂O Repellency (min) | Asphalt Wettability (% surface covered) | IPA Modified Water Repellency (H₂O:IPA) |
| --- | --- | --- | --- | --- | --- |
| 41 | Example 10 | 4.5 | <0.2 | 90 | 100:0 |
| 42 | Example 20 | 4.5 | <0.2 | none | 100:0 |

TABLE 3-continued

Quality test results for white roofing granules using acrylic binders.

| | | | | | |
|---|---|---|---|---|---|
| 43 | Example 1 | 4.5 | >60 | 95 | 85:15 |
| 44 | Example 19 | 4.5 | >60 | 95 to 100 | 80:20 |
| 45 | Example 9 | 4.5 | >60 | 90 | 90:10 |
| 46 | Example 18 | 4.5 | 0 | none | 100-0 |
| 47 | Example 8 | 4.5 | >60 | 85 to 90 | 85:15 |
| 48 | Example 2 | 4.5 | >60 | 90 to 95 | 85:15 |
| 49 | Example 4 | 4.5 | >60 | 70 to 80 | 90:10 |
| 50 | Example 3 | 4.5 | >60 | 70 to 80 | 85:15 |
| 51 | Example 5 | 4.5 | >60 | 90 to 95 | 80:20 |
| 52 | Example 14 | 4.5 | >60 | 95 | 75:25 |

TABLE 4

| Comp. Example | Asphalt Wettability (% surface covered) | $H_2O$ Repellency (min) | IPA Modified $H_2O$ Repellency | Dry Rub Loss (g) | Wet Rub Loss (g) |
|---|---|---|---|---|---|
| A. Raw Rock | 0 | 0 | 100:0 | 0.29 | 2.09 |
| B. Green Treated | 95 | 3 | 95:5 | 0.27 | 1.18 |
| C. White | 85 | >60 | 90:10 | 0.20 | 0.62 |

Various modifications and change to this invention will become apparent to those skilled in the art. Those skilled in the art will appreciate that the invention is not limited to the specific examples and materials described herein.

What is claimed is:

1. Coated granules suitable for use as roofing granule material comprising inorganic particles coated directly with an organometallic polymeric binder, wherein said inorganic particles comprise raw rock material, and said organometallic polymeric binder comprising the reaction product of water with at least one component of a binder precursor composition, said binder precursor composition comprising an uncured mixture, said uncured mixture comprising a water reactive organic polymer dissolved in a hydrolyzable liquid organometallic solvent, wherein said water reactive organic polymer of said uncured mixture has a weight average molecular weight of at least 100 wherein at least two in any sequence of three consecutive polymeric backbone atoms is carbon.

2. Granular material in accordance with claim 1 wherein said organometallic polymeric binder includes an organic pigment.

3. Granular material in accordance with claim 1, wherein said hydrolyzable organometallic compound is selected from the group consisting of compounds within the general formula:

wherein $R^1$ is selected from the group consisting of alkyl, cycloalkyl, aryl, or acyl;

$R^2$ is selected from the group consisting of hydrogen, alkyl, cycloalkyl, or aryl;

x is selected from the group consisting of an integer ranging from 1 to y, inclusive;

y is an integer equaling the valence of M; and

M is selected from the group consisting of B, Al, Si, or Ti.

4. Granular material in accordance with claim 1 wherein said water reactive organic polymer comprises a silane-functional addition polymer.

5. Granular material in accordance with claim 1 wherein the water reactive organic polymer comprises addition polymerized monomer units.

6. Granular material in accordance with claim 5 wherein said monomers are selected from the group consisting of acrylates, methacrylates, acrylamides, vinyl esters, vinyl aromatics, vinyl ethers, and vinyl heterocycles.

7. Granular material in accordance with claim 1 wherein said water reactive organic polymer comprises pendant hydrolyzable siloxane functionalities.

8. Granular material in accordance with claim 1 wherein said water reactive organic polymer comprises a hydrolyzable copolymer of an alkyl methacrylate and methacryloxypropyltrimethoxysilane.

9. Granular material in accordance with claim 1 wherein said water reactive organic polymer comprises a polymer blend formed from a combination of 2 or more dissimilar polymers.

10. Granular material in accordance with claim 1 wherein said water reactive organic polymer comprises polymers derived from hydrolyzable siloxane-functional monomers selected from the group consisting of vinyltriethoxysilane, vinyltris(2-methoxyethoxy) silane, and 3-methacryloxypropyltrimethoxysilane.

11. Granular materials in accordance with claim 1 wherein said hydrolyzable liquid organometallic solvent is selected from the group consisting of trimethyl borate, triethyl borate, triisopropyl borate, tri-n-butyl borate, aluminum tri-sec-butoxide, diethylaluminum ethoxide, tetramethoxysilane, tetraethoxysilane, tetraphenoxysilane, tetra(2-(2-methoxyethoxy)ethoxy)silane, tetraacetoxysilane, triethoxysilane, ethyl triethoxysilane, dimethyldiethoxysilane, trimethylsilylphenoxide, diphenyldimethoxysilane, titanium (IV) isopropoxide, titanium (IV) propoxide, and titanium (IV) 2-ethylhexoxide.

12. Granular material in accordance with claim 11 wherein the hydrolyzable liquid organometallic solvent is tetraethoxysilane.

13. Granular material in accordance with claim 1 wherein said hydrolyzable liquid organometallic solvent is tetraethoxysilane and the water reactive organic polymer is a hydrolyzable copolymer derived from the reaction of an alkyl methacrylate and an alkoxysilylalkylmethacrylate, said alkoxysilylalkylmethacrylate being selected from the group consisting of compounds within the general formula

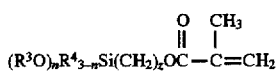

wherein:

n=an integer ranging from 1 to 3 inclusive;

z=an integer ranging from 1 to 10 inclusive;

$R^1$ is selected from the group consisting of alkyl, cycloalkyl, aryl, or acyl; and $R^4$ is selected from the group consisting of hydrogen, alkyl, cycloalkyl, or aryl, said binder further including a compound selected from the group consisting of hindered amine sebacates and substituted benzotriazoles.

14. Granular material in accordance with claim 13 wherein said hindered amine sebacate is bis-(1-octyloxy-2,2,6,6-tetramethyl-4-piperidinyl) sebacate and said substituted benzotriazole is 3-(2H-benzotriazol-2-yl)-5-(1,1-dimethylethyl)-4-hydroxybenzenepropanoic acid.

15. A method of making coated granules suitable for use as roofing granules, the method comprising the steps of:

(a) forming a binder precursor composition as described in claim 1;

(b) exposing a plurality of inorganic granules to moisture thereby yielding moisturized inorganic granules;

(c) optionally combining an organic pigment with the moisturized inorganic granules to form pigmented moisturized inorganic granules;

(d) combining the moisturized inorganic granules with the binder precursor composition to yield binder precursor composition-coated granules; and (e) exposing the binder precursor composition-coated granules to conditions sufficient to polymerize the binder precursor composition.

16. A method of making coated granules suitable for use as roofing granules, the method comprising the steps of:

(a) combining a binder precursor composition as described in claim 1 with moisture, inorganic granules, and optionally an organic pigment, to yield binder precursor composition-coated granules; and (e) exposing the binder precursor composition-coated granules to conditions sufficient to polymerize the binder precursor composition.

17. A method of making coated granules suitable for use as roofing granules, the method comprising the steps of:

(a) combining a binder precursor composition as described in claim 1 with an organic pigment to form an intermediate composition;

(b) exposing a plurality of inorganic granules to moisture thereby yielding moisturized inorganic granules;

(c) combining the moisturized inorganic granules with the intermediate composition to form pigmented binder precursor composition-coated granules; and (d) exposing the binder precursor composition-coated granules to conditions sufficient to polymerize the binder precursor composition.

18. Method in accordance with claim 15 wherein the exposing step (e) comprises heating the binder precursor coated granules to a temperature and for a duration sufficient to cure the binder precursor composition, the temperature ranging from about 100° C. to about 150° C., and the duration preferably ranging from about 10 to about 60 minutes.

19. Granular material in accordance with claim 1 wherein said inorganic particles have a particle size of greater than 425 micrometers.

20. Granular material in accordance with claim 1 wherein said water reactive organic polymer comprises a hydrolyzable copolymer of an alkyl methacrylate and an alkoxysilylalkylmethacrylate.

* * * * *